Figure 1:
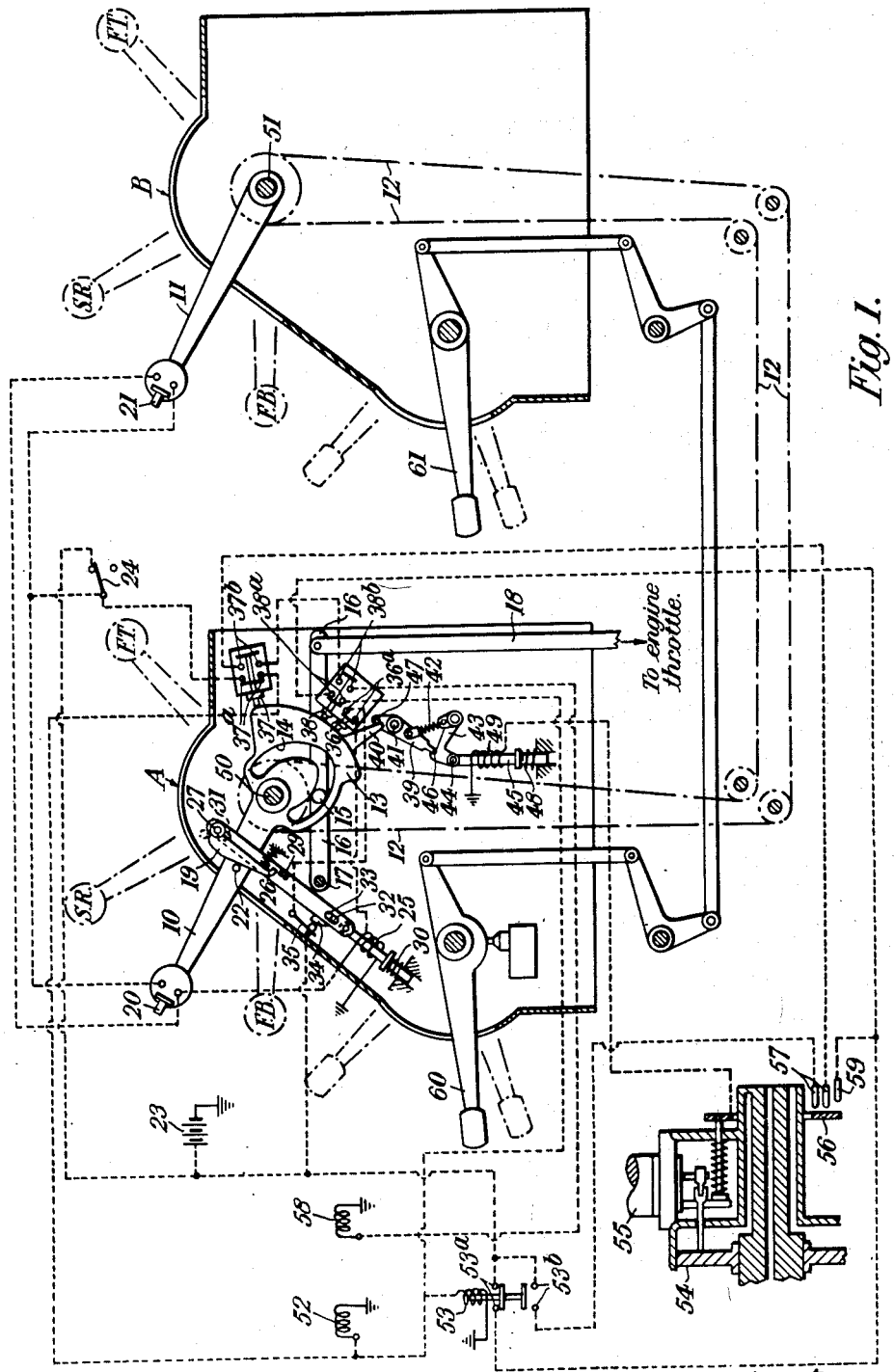

Dec. 29, 1953  C. H. SWAAB  2,664,166
ENGINE CONTROL FOR AIRCRAFT
Filed March 14, 1951  2 Sheets-Sheet 1

Inventor
Cyril Henry Swaab
By Moses, Nolte, Crews & Berry
Attorneys

Dec. 29, 1953

C. H. SWAAB 2,664,166

ENGINE CONTROL FOR AIRCRAFT

Filed March 14, 1951

2 Sheets-Sheet 2

Patented Dec. 29, 1953

2,664,166

UNITED STATES PATENT OFFICE 2,664,166

ENGINE CONTROL FOR AIRCRAFT

Cyril Henry Swaab, Blymhill, near Shifnal, England, assignor to H. M. Hobson Limited, London, England, a company of Great Britain Application March 14, 1951, Serial No. 215,582

6 Claims. (Cl. 170—135.74)

This invention relates to a throttle control installation for an aircraft engine fitted with a reversible pitch propeller, of the type in which the throttle lever is movable beyond the slow running position into a braking range and is arranged, when so moved, to effect progressive opening of the throttle, and also to render a pitch reversing mechanism effective to reverse the pitch of the propeller blades.

The advantage of an installation of this type is that, when landing, the pilot merely has to use the instinctive movement of pulling the throttle lever continuously back from the full throttle position, continued back movement of the lever beyond the slow running position automatically placing the propeller in reverse pitch and opening the throttle so that the propeller can exercise an increasing braking action as the lever is moved beyond the slow running position.

It is, however, a desideratum in an installation of this character (a) that the engine should be prevented from overspeeding when the propeller blades are at zero pitch and (b) that the engine should be prevented from stalling while the propeller blades are being reversed.

In British Patent No. 649,671, I have described a throttle control installation of the above type comprising means coacting with the throttle lever and operable thereby, when the throttle lever is moved to a position in the braking range corresponding to a throttle opening sufficient to prevent engine stall, to render the pitch-reversing mechanism effective to reverse the pitch of the propeller blades, in the case of movement of the lever to said position in the braking direction (i. e. from the slow running position), and to return the blade pitch to normal in the case of movement of the lever to said position in the opposite or unbraking direction, and a stop mechanism, controlled by the pitch-reversing mechanism, for preventing substantial continued movement of the throttle lever beyond said position in the braking direction until after the blades have been moved into reverse pitch, and in the unbraking direction until after the pitch-reversing mechanism has commenced to return the blade pitch to normal.

In such an aircraft, the pilot moves his throttle lever beyond the slow running position and into the braking range when he wishes to use the propeller as a brake on the ground. When the lever has moved sufficiently beyond the slow running position to open the throttle to an extent which will prevent the engine from stalling, the lever sets the pitch reversing mechanism in operation to reverse the blade pitch. If the pilot were permitted to move the lever beyond this position to open the throttle, the engine would overspeed while the blades are passing through the zero pitch position. The stop mechanism, however, prevents any substantial movement of the lever beyond the position at which the pitch reversing mechanism is rendered effective until pitch reversal has taken place. When the blades have moved sufficiently beyond the zero pitch position, the stop mechanism is disabled, thereby enabling the pilot to move the lever further away from slow running position to open up the throttle.

With the apparatus described in British Patent No. 649,671 the stop mechanism also serves, during unbraking, to arrest the throttle lever before it has reached the slow running position, and remains effective at least until the pitch reversing mechanism has begun to move the propeller blades back to normal pitch.

Sometimes, however, the pilot may find that, having reversed the pitch of the propeller blades for the purpose of braking, it is necessary to make an emergency take-off, and the present invention provides an alternative form of mechanism which, while preventing the engine from stalling or overspeeding during braking or unbraking nevertheless allows of unrestricted forward movement of the throttle lever from the full power brake position to the full throttle position.

In the arrangement according to the invention the throttle lever, as before, serves progressively to open the throttle as it is moved into the braking range, the pitch reversing mechanism is rendered operative by the throttle lever when it has moved into a position in the braking range corresponding to a throttle opening sufficient to prevent engine stall, and a stop mechanism prevents any substantial further movement of the throttle lever into the braking range, the stop mechanism being disabled by the pitch reversing mechanism when the blades have been moved into reverse pitch. The stop mechanism does not, however, prevent movement of the pilot's lever out of the braking range and into the normal range (i. e. the range between the slow running and full throttle positions) and operation of the pitch reversing mechanism in the direction to return the propeller blades to normal pitch is delayed until the throttle lever has moved through the slow running position and into a position at which the throttle is sufficiently open to prevent the engine from stalling. The pilot can, therefore, in an emergency, move his throttle lever without restriction from the full power brake position to the full throttle position. The engine cannot stall, because the throttle is sufficiently open to prevent this before the propeller blades begin to return to normal pitch. Overspeeding of the engine is prevented by the stop mechanism during braking, and is prevented during unbraking, despite rapid forward movement of the throttle lever to full throttle position in an emergency, by virtue of the fact that the throttle must be closed, with the blades in full reverse pitch, by movement of the throttle lever through the slow running position, before the propeller blades can begin to return to normal pitch. The throttle will have been practically closed immediately prior to initiation of operation of the pitch reversing mechanism to restore the blade pitch to normal, and there is substantially no danger of overspeeding however fast the throttle lever is moved on to the full throttle position, because the pitch of the blades is changed to normal more rapidly than the engine can accelerate in response to the movement of the throttle lever.

Figure 2:
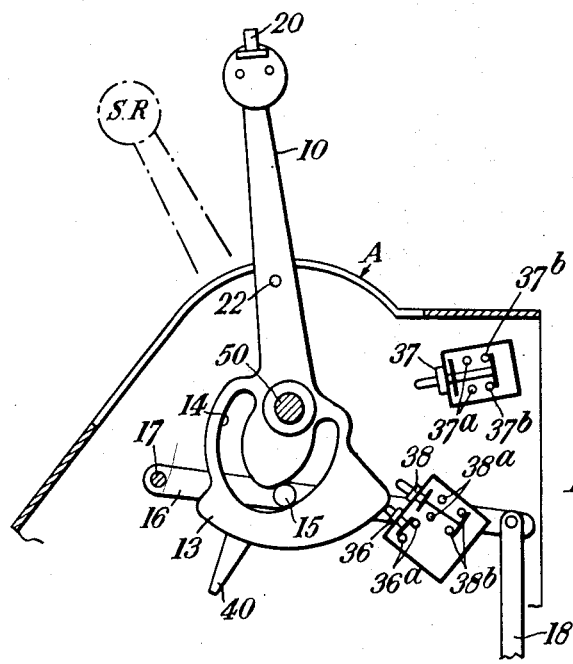
Figure 3:
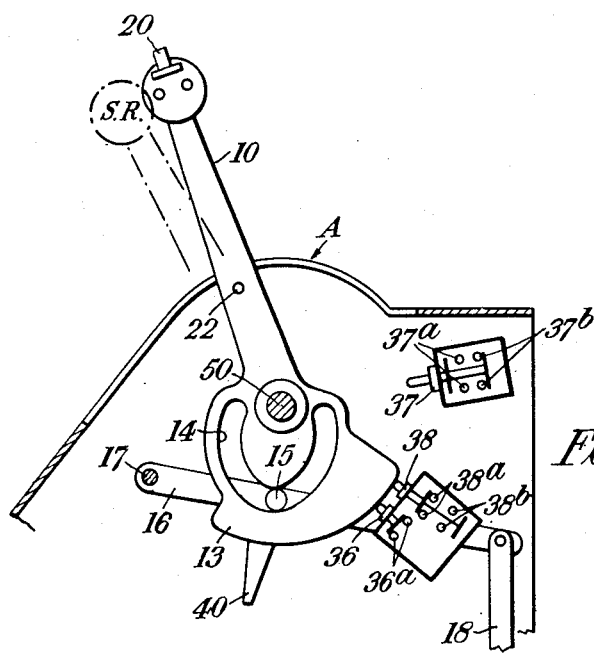

One specific embodiment of the invention will now be described in detail, by way of example, with reference to the accompanying diagrammatic drawings, in which Fig. 1 shows the parts in the position which they occupy when the throttle lever has been moved beyond the slow running position and into position to initiate reversal of the blade pitch, and Figs. 2 and 3 show the throttle lever moved into other positions in relation to the associated switches.

As in the case of British Patent No. 649,671, two control boxes A, B are provided for each engine, the throttle levers 10, 11 of the two control boxes being pivoted respectively at 50, 51 and being connected by chain and sprocket gearing 12 so that they move as one. The throttle lever 10 carries a cam 13 which is formed with a track 14 cooperating with a roller 15 on a lever 16 pivoted at 17 and connected, by a link 18, to the throttle (not shown). The cam track 14 is so shaped that movement of the pilot's lever in either direction from the slow running position S. R. serves to effect progressive opening of the throttle.

A slow running stop 19 normally coacts with a pin 22 on the lever 10 to prevent movement of the throttle levers 10, 11 beyond the slow running position and into the braking range. The stop 19, which is loaded by a compression spring 26, is pivoted on a fixed pin 27, and a projection 29 on a bar 28 coacts, when the throttle levers 10, 11 are in the slow running position, with the stop 19 to prevent the stop from being pushed aside by the pin 22. The bar 28 is urged upwardly by a spring 30 and is formed with slots 31, 32, respectively embracing the pivot pin 27 and a pin 33. On depression of either of a pair of push button switches, 20, 21, one on each throttle lever, however, a circuit is completed from a battery 23 to earth through a switch 24, which is controlled by the undercarriage so as to be closed only when the undercarriage has touched down, to energize an electromagnetic device e. g. a solenoid 25. Energization of the solenoid 25 draws the bar 28 downwardly, against the action of the spring 30, into the position shown in the drawing. This removes the projection 29 from beneath the tail of the slow running stop 19 and so enables the throttle lever 10 to be moved into the full line position shown, the stop 19 rocking anti-clockwise, as shown, against its spring 26 to allow the pin 22 to ride over it. When the bar 28 is moved downwardly by energization of the solenoid 25, a cam 34 on the bar closes a switch 35 to complete, via contacts 36ª of a micro switch 36, which is closed by the throttle lever cam 13 shortly before the lever has reached the slow running position, to complete a holding circuit for the solenoid 25. The slow running stop 19 is therefore disabled until the throttle lever has been moved forward into the normal range sufficiently to allow the contacts 36ª of the micro switch 36 to open.

Also associated with the throttle lever cam 13 are a brake selecting micro switch 37 and a brake releasing selecting micro switch 38. The switch 38 is operated by the cam, to close its contacts 38ª, and open its contacts 38ᵇ, shortly before the throttle lever 10 has reached the slow running position and the switch 37 is operated by the cam, to close its contacts 37ª, and open its contacts 37ᵇ, shortly after the throttle lever 10 has passed the slow running position. Operation of both switches 37, 38 takes place at a throttle opening sufficient to prevent engine stall. A stop 39 coacts with a projection 40 on the throttle lever cam 13, and serves to arrest the throttle lever 10 in the position shown in full lines and so to prevent movement of said lever through more than about 3° in the braking direction from the position at which the brake selecting switch 37 is operated.

The stop 39 is pivoted at 41 and is held, as shown, by a spring 42, connecting the stop and a latch 43 pivoted at 44 to a bar 45, with its tail 46 engaging the latch 43 and with a pin 47 on the stop preventing further movement of the throttle lever 10 towards the full brake position. The bar 45 is normally held by a spring 48 in position to retain the stop 39 in operative position. When, however, a solenoid 49 is energised, as later described, the bar 45 is drawn down to disable the stop and free the throttle lever 10 for further movement into the braking range.

Operation of the switch 37 completes a circuit through its contacts 37ª to energise a braking coil 52 and also a relay 53. Energisation of the braking coil 52 serves, as described in British Patent No. 649,671, to move an override valve (not shown) from a normal position, in which the governor of the constant speed propeller determines the blade pitch, into a position in which liquid is fed to a servo motor in the hub of the propeller in the direction to cause a servo piston 54 to move to the left and so to move the blades (one of which is shown at 55) into reverse pitch. Energisation of the relay closes a pair of contacts 53ª to establish a holding circuit for the braking coil 52 and relay 53 via the contacts 38ª of the operated brake releasing selection switch 38. The pitch changing mechanism will not be described in more detail, as it is identical with that shown in British Patent No. 649,671.

As the propeller blades move into reverse pitch, a propeller contact ring 56 first bridges a pair of contacts 57 to prepare a circuit for a brake releasing coil 58. This circuit is only completed however when, as later described, the relay contacts 53ᵇ close on de-energization of the relay 53 and the contacts 37ᵇ of switch 37 and the contacts 38ᵇ of switch 38 are closed on movement of the throttle lever 10 forwardly beyond the slow running position. After the blades have passed through zero pitch and are near full reverse pitch, the propeller contact ring 56 makes with a contact 59 to energise the solenoid 49 which disables the stop 39, as already described, allowing the throttle lever 10 to be moved to the limit of the braking range. This position is indicated at F. B. on the drawing.

The stop 39 is ineffective during unbraking. Forward movement of the throttle lever 10 to the slow running position allows the brake selection switch 37 to return to normal position, opening its contacts 37a and closing its contacts 37b. This breaks the circuit through the contacts 37a to the braking coil 52 and relay 53. When the lever 10 has reached a position somewhat in advance of slow running the brake releasing selection switch 38 returns to normal position, opening its contacts 38a and closing its contacts 38b. The opening of the contacts 38a breaks the holding circuit to the braking coil 52 and relay 53, and closure of the contacts 38b, in conjunction with the previous closing of the contacts 37b, completes a circuit through the contacts 57 and the now closed relay contacts 53b to energise the brake releasing coil 58. This, as described in British Patent No. 649,671, causes the override valve to move to its other extreme position, thereby causing the blade pitch to return to normal. The propeller contact ring 56 then, by moving away from the contact 59, first breaks the circuit to the solenoid 49, allowing the stop 39 to return to intercepting position. When the blades have returned to normal pitch the propeller contact ring 56 separates from the contacts 57 to break the circuit to the unbraking coil 58, the override valve returns to neutral position and the governor resumes control over the blade pitch.

Movement of the throttle lever 10 into the normal range allows the switch contacts 36a to open, thereby de-energizing the solenoid 25 and allowing the slow running stop 19 to return to operative position.

As already mentioned, the braking coil 52 is maintained energised until the throttle lever 10 has been moved forward beyond the slow running position and into position to allow the unbrake selecting switch 38 to return to normal position. This prevents the engine from overspeeding notwithstanding the fact that the throttle lever 10 is moved rapidly from the full brake position F. B. to the full throttle position F. T.

The installation includes a pair of speed control levers 60, 61 which operate as fully described in British Patent No. 649,671.

In the case of a multi-engined aircraft, the controls of corresponding engines on opposite sides of the aircraft are gauged together electrically, as in the case of British Patent No. 649,671, so that propeller braking cannot be applied to one engine without the other. The throttle levers of corresponding engines may likewise be electrically ganged together so that the slow running stops may only be disabled by pressure on the push button switches of both of the corresponding throttle levers in the control boxes.

What I claim as my invention and desire to secure by Letters Patent is:

1. In an aircraft, having a reversible pitch propeller and an engine throttle, a throttle control mechanism comprising a control lever mounted for movement from a neutral position in forward and rearward directions, a linkage connecting said control lever and said throttle, said linkage being effective to open said throttle on movement of said control lever either forwards or rearwards from its neutral position, pitch changing mechanism for shifting the blades of said propeller from normal pitch to reverse pitch and back again, first and second members positioned in the path of said control lever and arranged to be respectively actuated thereby on movement of said control lever to a first predetermined position rearward of the neutral position and on movement of said control lever to a second predetermined position forward of the neutral position, means operable by said first member for causing said pitch changing mechanism to reverse the pitch of the propeller, means operable by said second member for causing the pitch changing mechanism to return the propeller pitch to normal, a stop positioned in the path of said control lever to prevent, while the propeller is in normal pitch, substantial rearward movement of the control lever from its first predetermined position while permitting unobstructed forward movement of said control lever from said first predetermined position, and means controlled by the pitch changing mechanism for disabling said stop when the propeller has reached reverse pitch.

2. In an aircraft, having a reversible pitch propeller and an engine throttle, a throttle control mechanism comprising a control lever mounted for movement from a neutral position in forward and rearward directions, a linkage connecting said control lever and said throttle, said linkage being effective to open said throttle on movement of said control lever either forwards or rearwards from its neutral position, electrically controlled mechanism for changing the pitch of said propeller, a pair of electric switches positioned in the path of said control lever, means actuable by said switches to control said pitch changing mechanism, one of said switches being actuated, on movement of said control lever to a first predetermined position rearward of the neutral position, to cause said pitch changing mechanism to reverse the pitch of the propeller and the other of said switches being actuated, on movement of said control lever to a second predetermined position forward of the neutral position, to cause said pitch changing mechanism to return the propeller pitch to normal, a stop positioned in the path of said control lever to prevent, while the propeller is in normal pitch, substantial rearward movement of the control lever from its first predetermined position while permitting unobstructed forward movement of said control lever from said first predetermined position, and means controlled by the pitch changing mechanism for disabling said stop when the propeller has reached reverse pitch.

3. In an aircraft, having a reversible pitch propeller and an engine throttle, a throttle control mechanism comprising a control lever mounted for movement from a neutral position in forward and rearward directions, a linkage connecting said control lever and said throttle, said linkage being effective to open said throttle on movement of said control lever either forwards or rearwards from its neutral position, electrically controlled mechanism for changing the pitch of said propeller, a pair of electric switches positioned in the path of said control lever, means actuable by said switches to control said pitch changing mechanism, one of said switches being actuated, on movement of said control lever to a first predetermined position rearward of the neutral position, to cause said pitch changing mechanism to reverse the pitch of the propeller and the other of said switches being actuated, on movement of said control lever to a second predetermined position forward of the neutral position, to cause said pitch changing mechanism to return the propeller pitch to normal, a stop positioned in the path of said control lever to prevent, while the propeller is in normal pitch, substantial rearward movement of the control lever from its first predetermined position while permitting unobstructed forward movement of said control lever from said first predetermined position, and an electro-magnetic device controlled by the propeller for disabling said stop when the propeller is in reverse pitch.

4. In an aircraft, having a reversible pitch propeller and an engine throttle, a throttle control mechanism comprising a control lever mounted for movement from a neutral position in forward and rearward directions, a linkage connecting said control lever and said throttle, said linkage being effective to open said throttle on movement of said control lever either forwards or rearwards from its neutral position, electrically controlled mechanism for changing the pitch of said propeller, a pair of electric switches positioned in the path of said control lever, means actuable by said switches to control said pitch changing mechanism, one of said switches being actuated, on movement of said control lever to a first predetermined position rearward of the neutral position, to cause said pitch changing mechanism to reverse the pitch of the propeller and the other of said switches being actuated, on movement of said control lever to a second predetermined position forward of the neutral position, to cause said pitch changing mechanism to return the propeller pitch to normal, a stop positioned in the path of said control lever to prevent, while the propeller is in normal pitch, substantial rearward movement of the control lever from its first predetermined position while permitting unobstructed forward movement of said control lever from said first predetermined position, a solenoid, a spring for normally holding the stop in operative position, a contact ring controlled by the propeller, and a switch coacting with said contact ring and operable thereby, when the propeller has been set to reverse pitch, to energize said solenoid and thereby to move said stop against said spring into an inoperative position.

5. In an aircraft, having a reversible pitch propeller and an engine throttle, a throttle control mechanism comprising a control lever mounted for movement from a neutral position in forward and rearward directions, a linkage connecting said control lever and said throttle, said linkage being effective to open said throttle on movement of said control lever either forwards or rearwards from its neutral position, electrically controlled mechanism for changing the pitch of said propeller, first and second electric switches positioned in the path of said control lever, the first switch being actuated by the control lever on movement thereof to a first predetermined position rearward of the neutral position and the second switch being actuated by the control lever on movement thereof to a second predetermined position forward of the neutral position, a first coil arranged, when energized, to cause said pitch changing mechanism to reverse the propeller pitch, a second coil arranged, when energized, to cause said pitch changing mechanism to return the propeller pitch to normal, circuits connecting said coils and switches for energising the first coil on actuation of the first switch and the second coil on actuation of the second switch, a stop positioned in the path of said control lever to prevent, while the propeller is in normal pitch, substantial rearward movement of the control lever from its first predetermined position while permitting unobstructed forward movement of said control lever from said first predetermined position, and means controlled by the pitch changing mechanism for disabling said stop when the propeller has reached reverse pitch.

6. In an aircraft, having a reversible pitch propeller and an engine throttle, a throttle control mechanism comprising a control lever mounted for movement from a neutral position in forward and rearward directions, a linkage connecting said control lever and said throttle, said linkage being effective to open said throttle on movement of said control lever either forwards or rearwards from its neutral position, electrically controlled mechanism for changing the pitch of said propeller, a stop for normally preventing movement of the control lever rearwardly from the neutral position, a first electric switch positioned in the path of said control lever for actuation thereby when said lever occupies its neutral position or a position rearward of the neutral position, a push-button switch, a solenoid for disabling said stop, circuits arranged, on actuation of said push-button switch to energise said solenoid to disable said stop and to hold said solenoid energised through said first switch until said control lever has been moved into a position clear of said first switch, second and third electric switches positioned in the path of said control lever, means actuable by said second and third switches to control said pitch changing mechanism, said second switch being actuated, on movement of said control lever to a first predetermined position rearward of the neutral position, to cause said pitch changing mechanism to reverse the pitch of the propeller and said third switch being actuated, on movement of said control lever to a second predetermined position forward of the neutral position, to cause said pitch changing mechanism to return the propeller pitch to normal, a further stop positioned in the path of said control lever to prevent, while the propeller is in normal pitch, substantial rearward movement of the control lever from its first predetermined position while permitting unobstructed forward movement of said control lever from said first predetermined position, and means controlled by the pitch changing mechanism for disabling said further stop when the propeller has reached reverse pitch.

CYRIL HENRY SWAAB.

References Cited in the file of this patent

UNITED STATES PATENTS

| Number | Name | Date |
|---|---|---|
| 1,693,451 | McCauley et al. | Nov. 27, 1928 |
| 1,935,620 | Dickey | Nov. 21, 1933 |
| 2,446,700 | Giles et al. | Aug. 20, 1948 |
| 2,500,811 | Forsyth | Mar. 14, 1950 |